(12) United States Patent
Elliott et al.

(10) Patent No.: US 7,819,465 B2
(45) Date of Patent: Oct. 26, 2010

(54) TRANSFERABLE B-PILLAR FOR FACILITATING INGRESS/EGRESS

(75) Inventors: Adrian Nicholas Alexander Elliott, Dearborn, MI (US); Jason Falenski, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 12/341,244

(22) Filed: Dec. 22, 2008

(65) Prior Publication Data
US 2010/0156140 A1    Jun. 24, 2010

(51) Int. Cl.
*B60J 5/04* (2006.01)
(52) U.S. Cl. .................. 296/202; 296/146.1; 49/366
(58) Field of Classification Search ............. 296/146.1, 296/146.9, 147, 155, 202; 49/61, 63, 67, 49/116, 366
See application file for complete search history.

(56) References Cited

U.S. PATENT DOCUMENTS

| | | | |
|---|---|---|---|
| 1,869,274 A | 7/1932 | Phillips | |
| 2,265,434 A | 12/1941 | Kibbey | |
| 2,997,336 A | 8/1961 | Huggins et al. | |
| 6,332,641 B1 | 12/2001 | Okana | |
| 6,694,676 B2 | 2/2004 | Sakamoto et al. | |
| 6,779,831 B2 | 8/2004 | Moriyama | |
| 7,032,953 B2 | 4/2006 | Rangnekar et al. | |
| 7,144,064 B2 * | 12/2006 | Azzouz et al. | ........... 296/146.1 |

FOREIGN PATENT DOCUMENTS

GB    2408025 A    5/2005

* cited by examiner

*Primary Examiner*—Lori L Lyjak
(74) *Attorney, Agent, or Firm*—Gregory P. Brown; Price, Heneveld, Cooper, DeWitt & Litton, LLP

(57) ABSTRACT

A door system includes a vehicle frame defining a door opening. A forward opening door is disposed in the door opening and has a forward edge hingedly connected to a forward support pillar and a rearward edge securely engageable with an intermediate support pillar. A rearward opening door is disposed in the door opening and has a rearward edge hingedly connected to a rearward support pillar and a forward edge securely engageable with the intermediate support pillar. A latching system has frame latches that removably attach the intermediate support pillar to the vehicle frame and door latches that removably connect the intermediate support pillar to one of the forward opening door and rearward opening door, such that the intermediate support pillar is connected to one or more of the vehicle frame, forward opening door, and rearward opening door at all times.

20 Claims, 8 Drawing Sheets

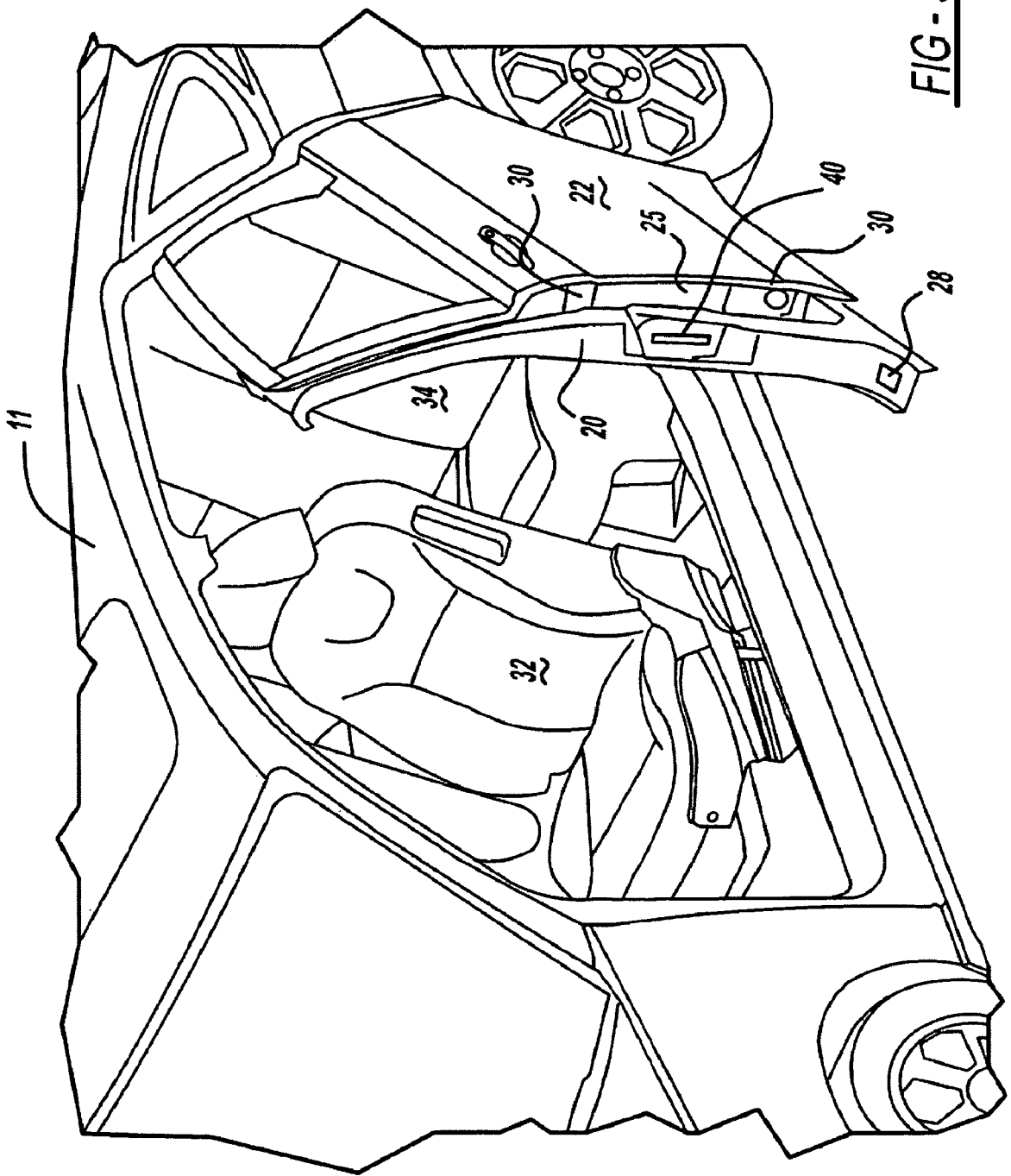

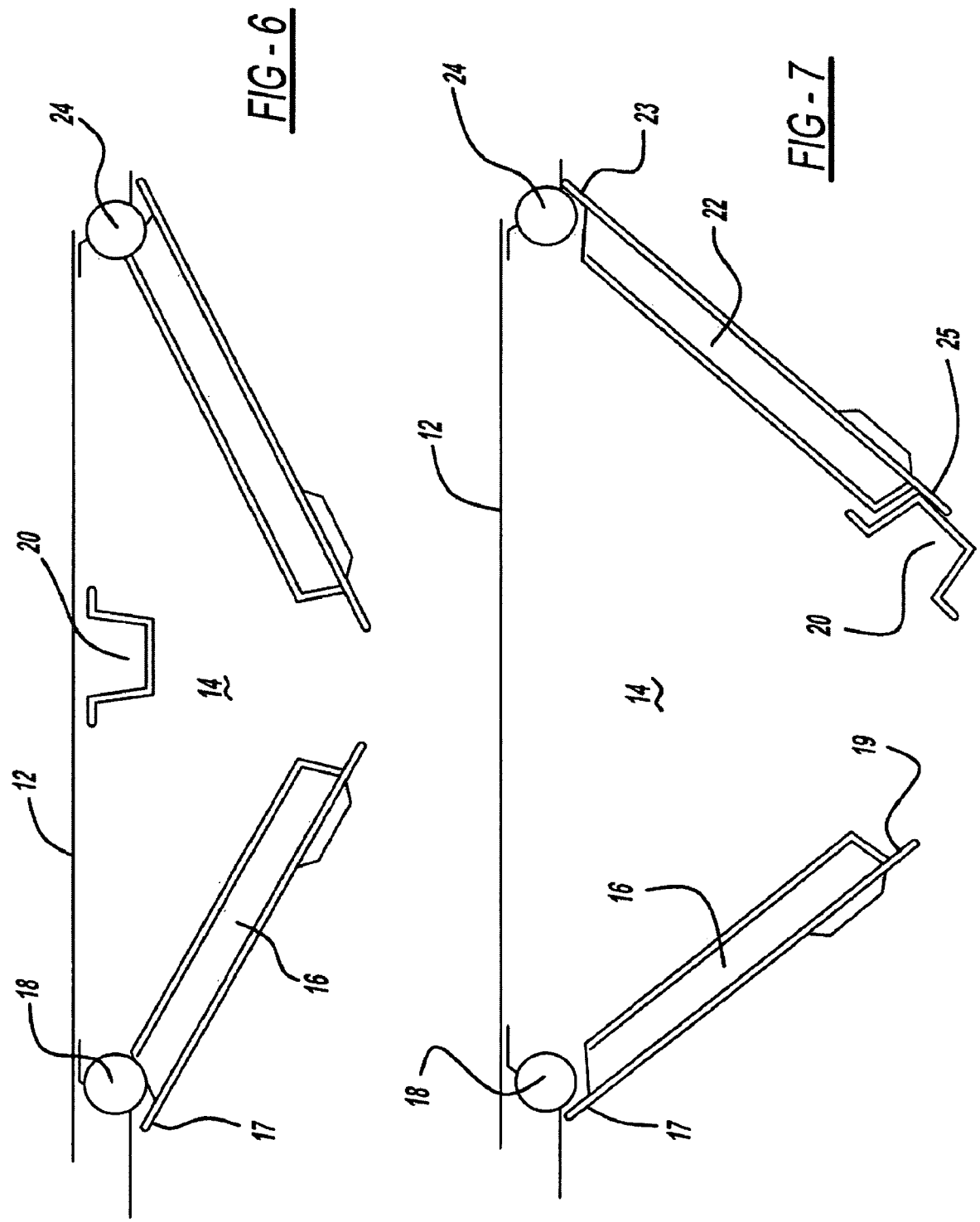

US 7,819,465 B2

TRANSFERABLE B-PILLAR FOR FACILITATING INGRESS/EGRESS

FIELD OF THE INVENTION

The present invention relates to transferable support pillars for facilitating ingress/egress, and more specifically, to transferable support pillars that maintain a connection with a vehicle frame or vehicle door at all times.

BACKGROUND OF THE PRESENT INVENTION

Vertical support pillars, such as B- pillars, provide structural support to a vehicle and provide additional strength to the vehicle during a side impact. Vertical support pillars also enable continuous sealing between the frame and respective door for the full periphery of the door opening.

SUMMARY OF THE INVENTION

In one aspect of the present invention, a door system includes a vehicle frame defining a door opening. A forward opening door is disposed in the door opening and has a forward edge hingedly connected to a forward support pillar and a rearward edge securely engageable with an intermediate support pillar. A rearward opening door is disposed in the door opening and has a rearward edge hingedly connected to a rearward support pillar and a forward edge securely engageable with the intermediate support pillar. A latching system has frame latches that removably attach the intermediate support pillar to the vehicle frame and door latches that removably connect the intermediate support pillar to one of the forward opening door and rearward opening door, such that the intermediate support pillar is connected to one or more of the vehicle frame, forward opening door, and rearward opening door at all times.

In another aspect of the present invention, a door system for a vehicle includes a first support column fixed to a frame of the vehicle and hingedly connected to a first door that is operable between open and closed positions. A second support column is fixed to the vehicle frame and hingedly connected to a second vehicle door that is operable between open and closed positions. A third support column is securely engageable with the vehicle frame, first vehicle door, and second vehicle door. A latching system is operable between enabled and disabled positions and disposed in the third support column. The latching system includes frame connectors that detachably connect the third support column to the vehicle frame and door connectors that detachably connect the third support column to one of the first vehicle door and second vehicle door. An actuator is disposed in the third support column that operates to disengage one of the frame connectors and door connectors when one of the first and second doors is in the closed position.

In yet another aspect of the present invention, a method for opening vehicle doors on a vehicle includes a step of providing a vehicle frame that defines a door opening having first and second doors. The first vehicle door is hingedly connected to a first support column. The second vehicle door is hingedly connected to a second support column. A multi-positionable third support column is detachably connected to the vehicle frame by frame connectors. The multi-positionable third support column is detachably connected to at least one of the first vehicle door and second vehicle door by door connectors. The multi-positionable third support column is detachably connected to either the vehicle frame or one of the first and second vehicle doors, such that the multi-positionable third support column is operable between a first position wherein the multi-positionable third support column is connected to the frame and a second position wherein the multi-positionable third support column is connected to one of the first and second vehicle doors. The multi-positionable third support column is connected to the vehicle frame such that the multi-positionable third support column can only be disconnected from the vehicle frame after being connected to one of the first and second vehicle doors. The multi-positionable third support column is connected to one of the first and second vehicle doors such that the multi-positionable third support column can only be disconnected from one of the first and second vehicle doors after being connected to the vehicle frame.

These and other features, advantages, and objects of the present invention will be further understood and appreciated by those skilled in the art upon studying the following specification, claims, and appended drawings.

BRIEF DESCRIPTION OF THE DRAWINGS

FIG. 5 is an enlarged isometric perspective view of the rearward opening door in an opened position and in secure engagement with the support pillar;

FIG. 6 is a plan view of the support pillar while engaged with the vehicle frame;

FIG. 7 is a plan view of the support pillar after disengagement with the vehicle frame and engagement with the rearward opening door in the open position;

DETAILED DESCRIPTION OF EMBODIMENTS

Figure 1:
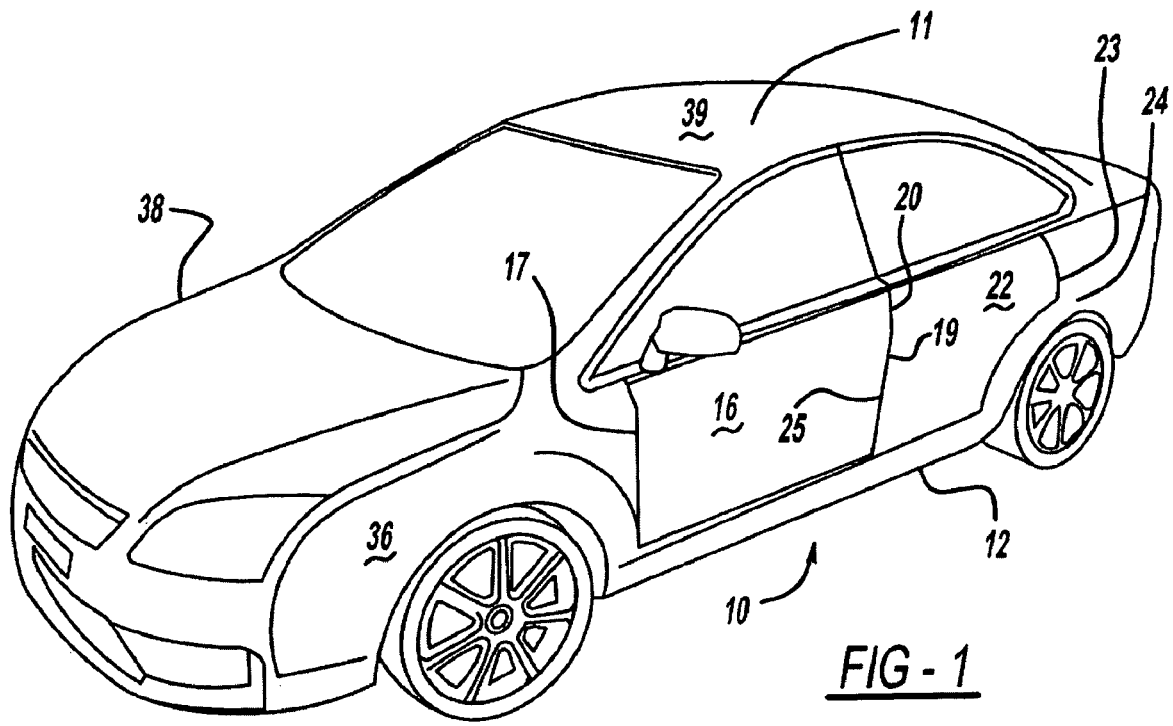
FIG. 1 is an isometric perspective view of a vehicle incorporating one embodiment of a transferrable support pillar.

For purposes of description herein the terms "upper," "lower," "right," "left," "rear," "front," "vertical," "horizontal" and derivatives thereof shall relate generally to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
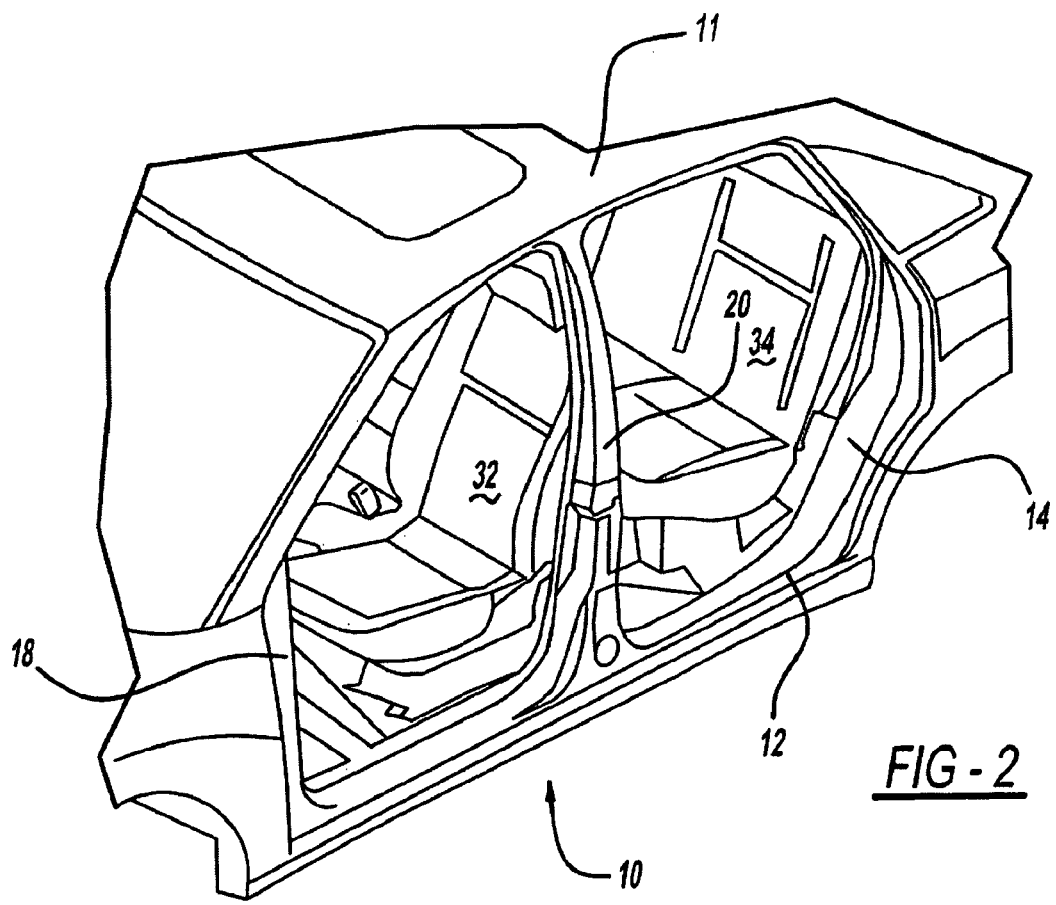
FIG. 2 is an enlarged isometric perspective view of a portion of FIG. 1 illustrating the support pillar.
Figure 3:
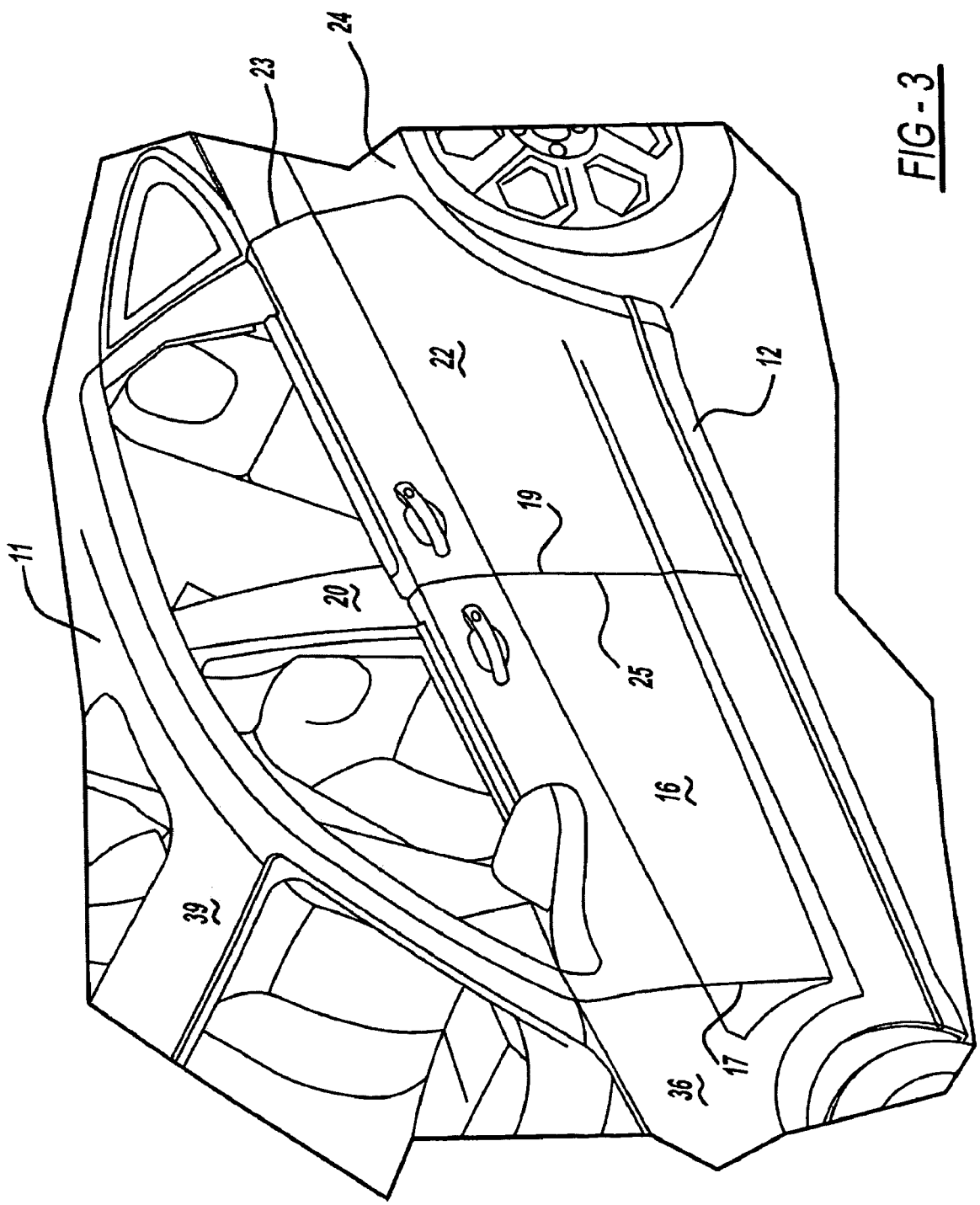
FIG. 3 is an enlarged isometric perspective view of the support pillar with the forward opening door and rearward opening door in the closed position.

Referring to FIGS. 1-3, which illustrate one embodiment of a transferrable support pillar of the present invention for use on a vehicle, the reference numeral 10 generally designates a door system for a vehicle 11 having a vehicle frame 12 defining a door opening 14. A forward opening door 16 is disposed in the door opening 14 and has a forward edge 17 hingedly connected to a forward support pillar 18 and a rearward edge 19 securely engageable with an intermediate support pillar 20. A rearward opening door 22 is disposed in the door opening 14 and has a rearward edge 23 hingedly connected to a rearward support pillar 24 and a forward edge 25 securely engageable with the intermediate support pillar 20. A latching system 26 has frame connectors 28 that removably attach the intermediate support pillar 20 to the vehicle frame 12 and door connectors 30 that removably connect the intermediate support pillar 20 to one of the forward opening door 16 and rearward opening door 22, such that the intermediate support pillar 20 is connected to one or more of the vehicle frame 12, forward opening door 16, and rearward opening door 22 at all times.

As shown in FIGS. 1 and 2, the vehicle includes front and back seats 32, 34 for carrying passengers. The forward support pillar 18, intermediate support pillar 20, and rearward support pillar 24 are disposed in order from the front to the back of the vehicle 11 on first and second sides 36, 38 of the vehicle 11. The pillars 18, 20, 24 provide strength and support the roof 39 above the heads of passengers. The intermediate support pillar 20 is centrally disposed between the forward support pillar 18 and rearward support pillar 24 and is latched to the frame 12 by the frame connectors 28. The frame connectors 28 securely hold the intermediate support pillar 20 in place inside the door opening 14.

Referring to FIG. 3, the rearward edge 19 of the forward opening door 16 is engageable with the intermediate support pillar 20 and abuts the intermediate support pillar 20 when in the closed position. Similarly, the forward edge 25 of the rearward opening door 22 engages and abuts the intermediate support pillar 20 when in the closed position.

Figure 4:
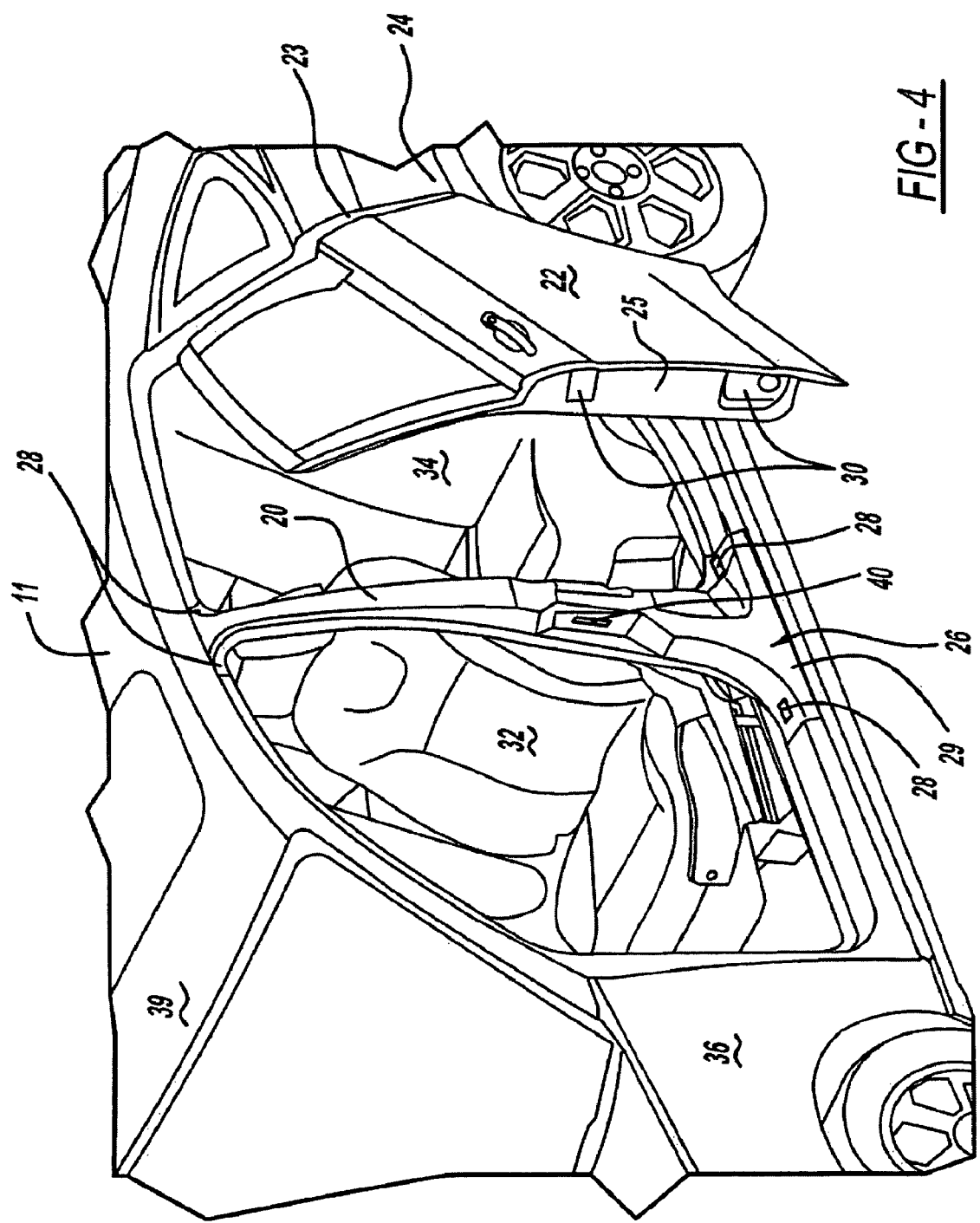
FIG. 4 is an enlarged isometric perspective view of the vehicle with the forward opening door removed and the rearward opening door in an open position exposing the support pillar.

FIG. 4 illustrates the rearward opening door 22 partially opened and disengaged from the intermediate support pillar 20. The intermediate support pillar 20 is latched via a latching system 26 with the door opening 14 by the frame connectors 28 such that the intermediate support pillar 20 cannot be removed from the door opening 14. The frame connectors 28 connect a top portion of the intermediate support pillar 20 to the vehicle frame 12 and also connect a base support 29 of the intermediate support pillar 20 to the vehicle frame 12. The base support 29 supports the intermediate support pillar 20 in position in the vehicle frame 12 of the vehicle 11 and has a width that is greater than the width of the intermediate support pillar 20.

As shown in FIG. 5, the intermediate support pillar 20 may be removed from the door opening 14 after secure engagement with the forward edge 25 of the rearward opening door 22. When the rearward opening door 22 is securely engaged with the intermediate support pillar 20, the handle 40 is actuated. The actuation of the handle 40 releases the frame connectors 28 from connecting the intermediate support pillar 20 to the door opening 14. At the same time, the handle 40 prevents actuation of door connectors 30 so that the intermediate support pillar 20 remains secure to the forward edge 25 of the rearward opening door 22. When the rearward opening door 22 is opened, as shown in FIG. 5, the intermediate support pillar 20 cannot be unlatched from the forward edge of the rearward opening door 22. However, if the rearward opening door 22 is again placed in the closed position, the handle 40 can be actuated to securely engage the frame connectors 28 of the intermediate support pillar 20 to the door opening 14 such that the door connectors 30 become disengaged. An actuator handle 40 is disposed on the intermediate support pillar 20. However, it is contemplated that the handle 40 may be disposed on the forward edge 25 of the rearward opening door 22 or on the rearward edge 19 of the forward opening door 16.

FIGS. 6 and 7 illustrate the concept above. Specifically, the forward opening door 16 and rearward opening door 22 may be opened leaving the intermediate support pillar 20 attached to the frame 12 that defines the door opening 14. The rearward opening door 22, upon secure engagement with the intermediate support pillar 20 may be latched thereto by actuation of the handle 40 such that the frame connectors 28 disengage while the door connectors 30 engage the rearward opening door 22. The rearward opening door 22 can then be opened while maintaining a secure connection with the intermediate support pillar 20. It will be understood by one having ordinary skill in the art that the intermediate support pillar 20 could also operate in the same manner, but attach with the forward opening door 16.

Figure 8:
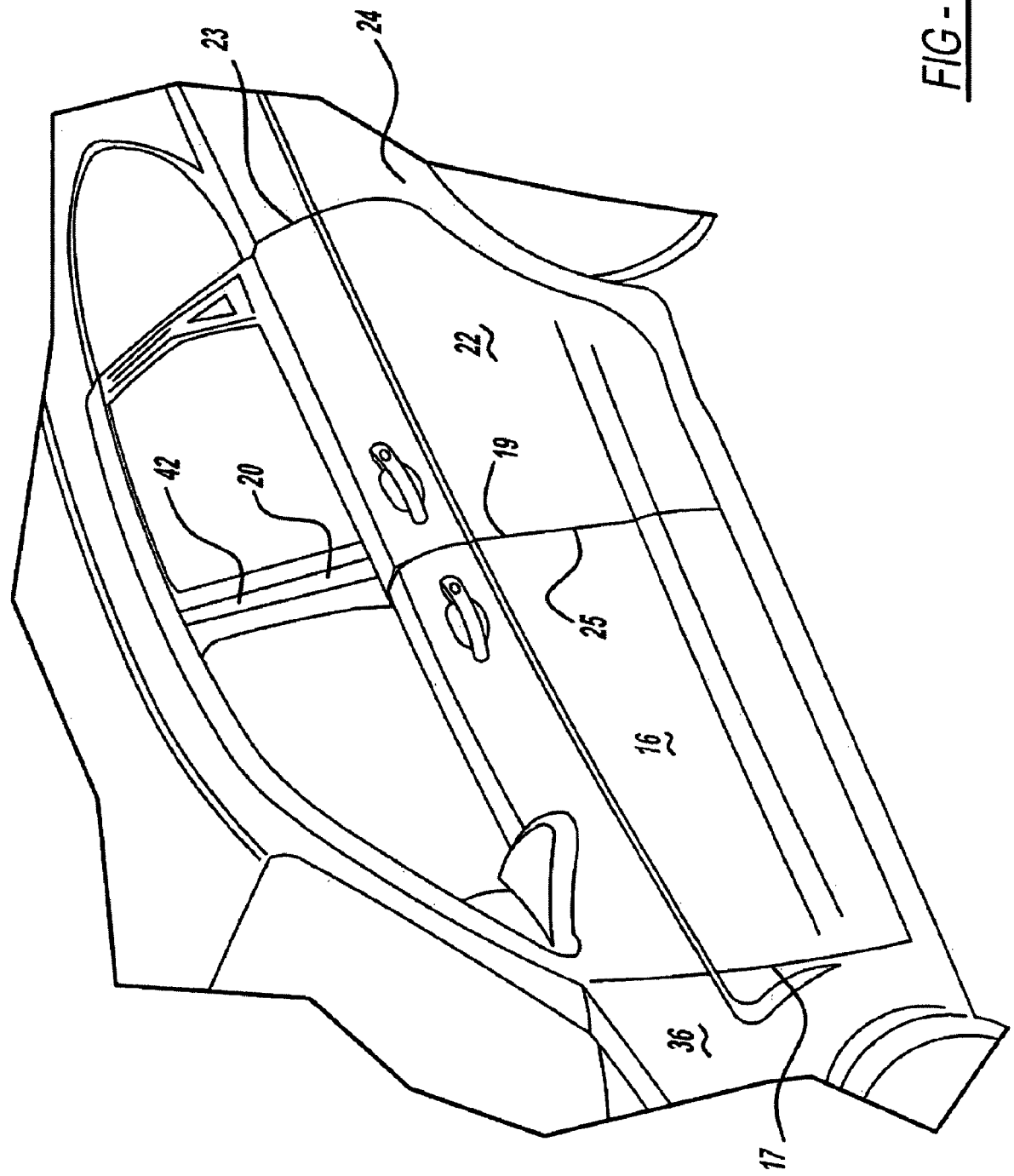
FIG. 8 is an isometric perspective view of another embodiment of a transferrable support pillar of a vehicle.
Figure 9:
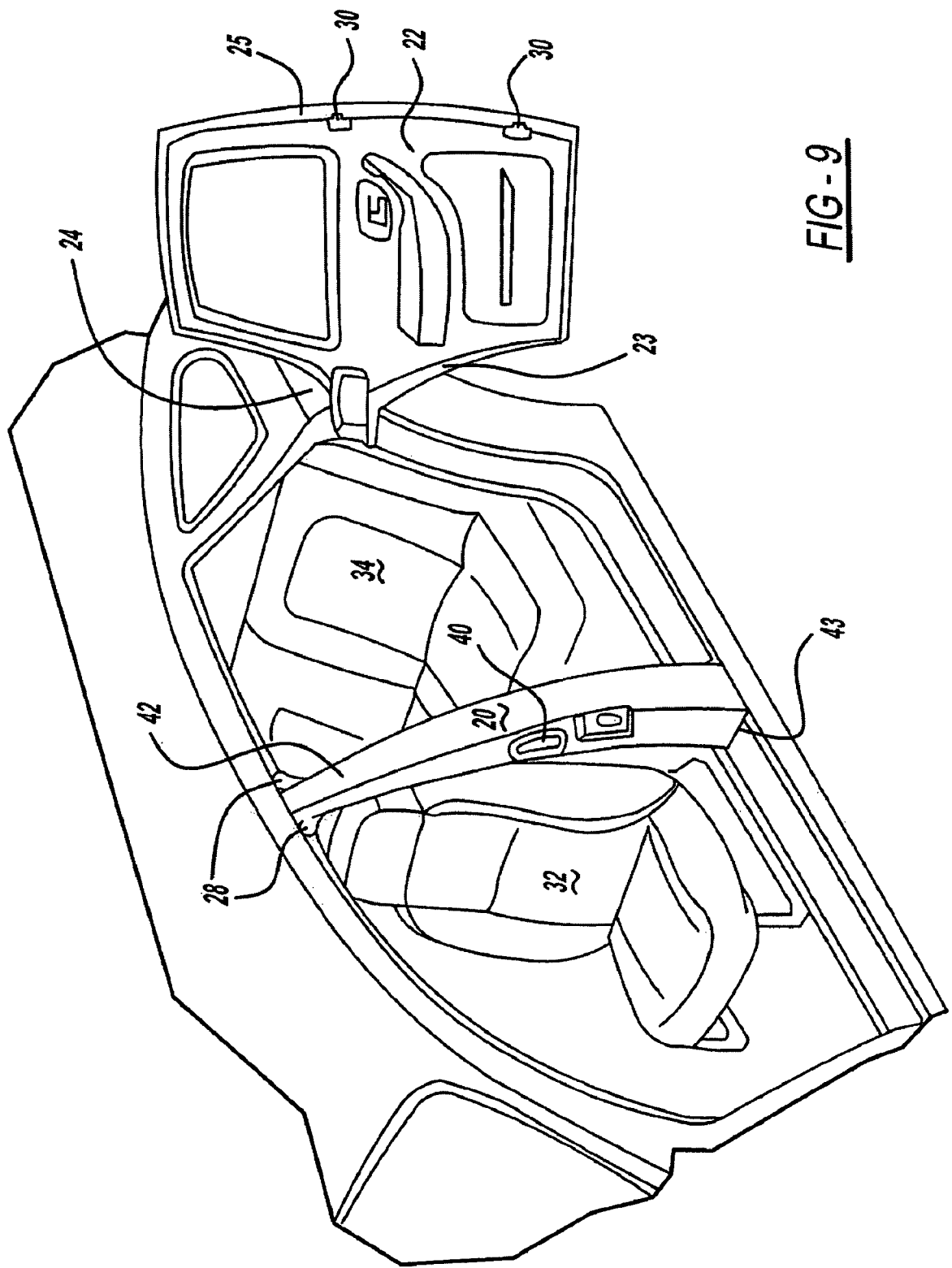
FIG. 9 is an isometric perspective view of the support pillar of FIG. 8 while engaged with the vehicle frame.
Figure 10:
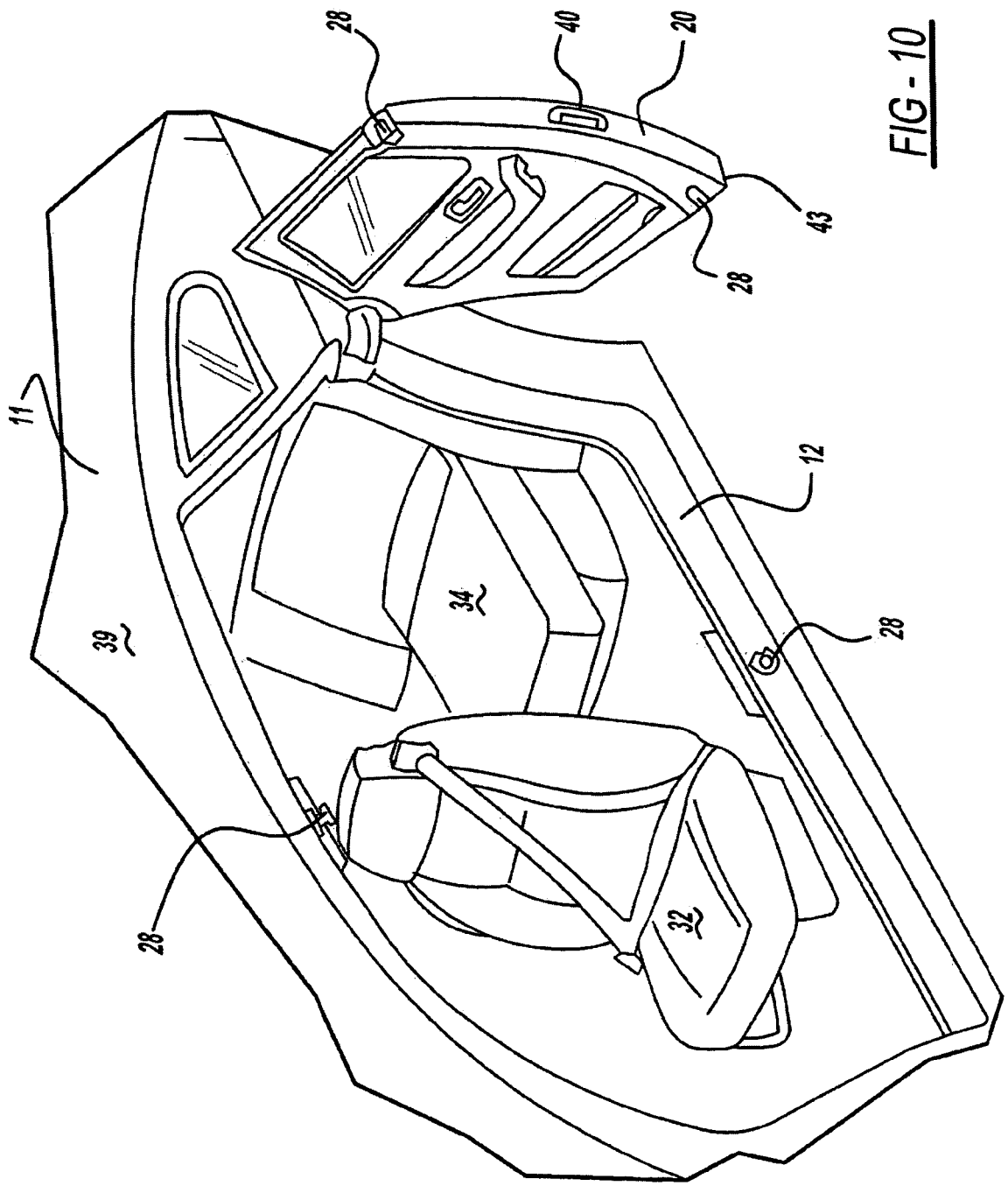
FIG. 10 is an isometric perspective view of the support pillar after disengagement with the vehicle frame and engagement with the rearward opening door.

Referring now to FIG. 8, another embodiment of the present invention includes the intermediate support pillar 20 having a partially externally exposed face 42. The forward and rearward opening doors 16, 22 operate in the same manner, but the intermediate support pillar 20 has a slightly different design. Specifically, the intermediate support pillar 20 lacks the base support 29 discussed above with respect to the prior embodiment, and instead includes an abutment portion 43 (FIG. 9) that rests on the vehicle frame 12 in the door opening 14. The abutment portion 43 does not flare out like the base support 29, but instead maintains the general width of the intermediate support pillar 20. The intermediate support pillar 20 may be unlatched from the frame connectors 28 on the vehicle frame 12 and secured to the rearward opening door 22 (or possibly the forward opening door 16) by the door connectors 30.

The above description is considered that of the illustrated embodiments only. Modifications of the invention will occur to those skilled in the art and to those who make or use the invention. Therefore, it is understood that the embodiments showing the drawings and described above are merely for illustrative purposes and not intended to limit the scope of the invention, which is defined by the following claims as interpreted according to the principles of patent law, including the Doctrine of Equivalents.

We claim:

1. A door system comprising:
   a vehicle frame defining a door opening;
   a forward opening door disposed in the door opening and having a forward edge hingedly connected to a forward support pillar and a rearward edge securely engageable with an intermediate support pillar;
   a rearward opening door disposed in the door opening and having a rearward edge hingedly connected to a rearward support pillar and a forward edge securely engageable with the intermediate support pillar; and
   a latching system having frame connectors that detachably connect the intermediate support pillar to the vehicle frame and door connectors that detachably connect the intermediate support pillar to one of the forward opening door and rearward opening door, such that the intermediate support pillar is connected to one or more of the vehicle frame, forward opening door, and rearward opening door at all times.

2. The door system of claim 1, further comprising:
   a base support that is wider than the intermediate support pillar.

3. The door system of claim 2, wherein:
at least one frame connector extends through the base support.

4. The door system of claim 1, further comprising:
a handle that operates to detach the frame connectors from the vehicle frame.

5. The door system of claim 4, wherein:
the handle is disposed on the intermediate support pillar.

6. The door system of claim 4, wherein:
the handle is disposed on one of the forward opening door and rearward opening door.

7. The door system of claim 1, wherein:
the intermediate support pillar includes a partially externally exposed face.

8. A door system for a vehicle comprising:
a first support column fixed to a frame of the vehicle and hingedly connected to a first door that is operable between open and closed positions;
a second support column fixed to the vehicle frame and hingedly connected to a second vehicle door that is operable between open and closed positions;
a third support column securely engageable with the vehicle frame, first vehicle door, and second vehicle door;
a latching system disposed in the third support column, the latching system including:
  frame connectors that detachably connect the third support column to the vehicle frame; and
  door connectors that detachably connect the third support column to one of the first vehicle door and second vehicle door;
  an actuator disposed in the third support column that operates to disengage one of the frame connectors and door connectors when one of the first and second doors is in the closed position.

9. The door system of claim 8, further comprising:
a base support that is wider than the intermediate support pillar.

10. The door system of claim 8, further comprising:
an abutment portion that rests on the door frame of the vehicle.

11. The door system of claim 8, further comprising:
a handle that operates to detach the frame connectors from the vehicle frame.

12. The door system of claim 11, wherein:
the handle is disposed on the intermediate support pillar.

13. The door system of claim 11, wherein:
the handle is disposed on one of the forward opening door and rearward opening door.

14. The door system of claim 8, wherein:
the intermediate support pillar includes a partially externally exposed face.

15. A method for opening vehicle doors on a vehicle, the method comprising:
providing a vehicle frame that defines a door opening with first and second doors;
hingedly connecting the first vehicle door to a first support pillar;
hingedly connecting the second vehicle door to a second support pillar;
detachably connecting a multi-positionable third support pillar to the vehicle frame by frame connectors;
detachably connecting the multi-positionable third support pillar to at least one of the first vehicle door and second vehicle door by door connectors; and
detachably connecting the multi-positionable third support pillar to either the vehicle frame or one of the first and second vehicle doors, such that the multi-positionable third support pillar is operable between a first position wherein the multi-positionable third support pillar is connected to the frame and a second position wherein the multi-positionable third support pillar is connected to one of the first and second vehicle doors.

16. The method of claim 15, further comprising:
providing a latching system that enables the third support pillar to move between the first position and the second position.

17. The method of claim 15, further comprising:
providing a handle that actuates the latching system.

18. The method of claim 15, further comprising:
connecting the handle with the third support pillar.

19. The method of claim 15, further comprising:
forming a base support on the third support pillar.

20. The method of claim 15, further comprising:
forming a partially externally exposed face on the third support pillar.

* * * * *